United States Patent [19]

Cushing

[11] Patent Number: 4,672,331

[45] Date of Patent: Jun. 9, 1987

[54] SIGNAL CONDITIONER FOR ELECTROMAGNETIC FLOWMETER

[76] Inventor: Vincent J. Cushing, 153 Williams Dr., Annapolis, Md. 21401

[21] Appl. No.: 830,247

[22] Filed: Feb. 18, 1986

Related U.S. Application Data

[63] Continuation-in-part of Ser. No. 506,479, Jun. 21, 1983, abandoned.

[51] Int. Cl.$^4$ .............................................. G01F 1/60
[52] U.S. Cl. ................................. 331/65; 73/861.17; 340/347 NT; 340/347 CC
[58] Field of Search .......... 331/65; 73/861.11, 861.12, 73/861.13, 861.14, 861.15, 861.16, 861.17; 340/347 M, 347 NT, 347 CC

[56] References Cited

U.S. PATENT DOCUMENTS

| | | | |
|---|---|---|---|
| 3,783,687 | 1/1974 | Mannherz et al. | 73/861.17 |
| 4,309,909 | 1/1982 | Grebe, Jr. et al. | 73/861.12 |
| 4,339,958 | 7/1982 | Shauger | 73/861.17 |
| 4,417,479 | 11/1983 | Schmook et al. | 73/861.16 |

Primary Examiner—Siegfried H. Grimm
Attorney, Agent, or Firm—Sughrue, Mion, Zinn, Macpeak and Seas

[57] ABSTRACT

A voltage to frequency converter or conditioner adapted for use with electromagnetic flowmeters produces a signal whose output frequency is related to measured flow while compensating for power frequency interference and variations in magnet current or magnetic induction B. The driving signal is summed with a feedback signal and coupled to a sampling integrator which drives the detector. The output of the detector (which may be integrated) is provided as the input to a VCO for producing the desired output signal. The VCO output is also coupled into a feedback circuit to which is also coupled a reference voltage which is at least proportional to the magnetic induction B or magnet current I. In one embodiment of the invention, an up/down counter is up counted using the VCO's output as a clock for a fixed time and is then down counted by a clocking signal related to power main's frequency. The time required for the down count operation is used to meter the feedback voltage to the summing junction at the input of the integrating sampler. This metering of the feedback voltage may be eliminated by the use of a multiplying DAC which produces an analog voltage corresponding to the product of the reference voltage and the count attained in the up/down counter which is modified so as to eliminate the necessity for down counting and is rather reset at the beginning of each integration period.

22 Claims, 17 Drawing Figures

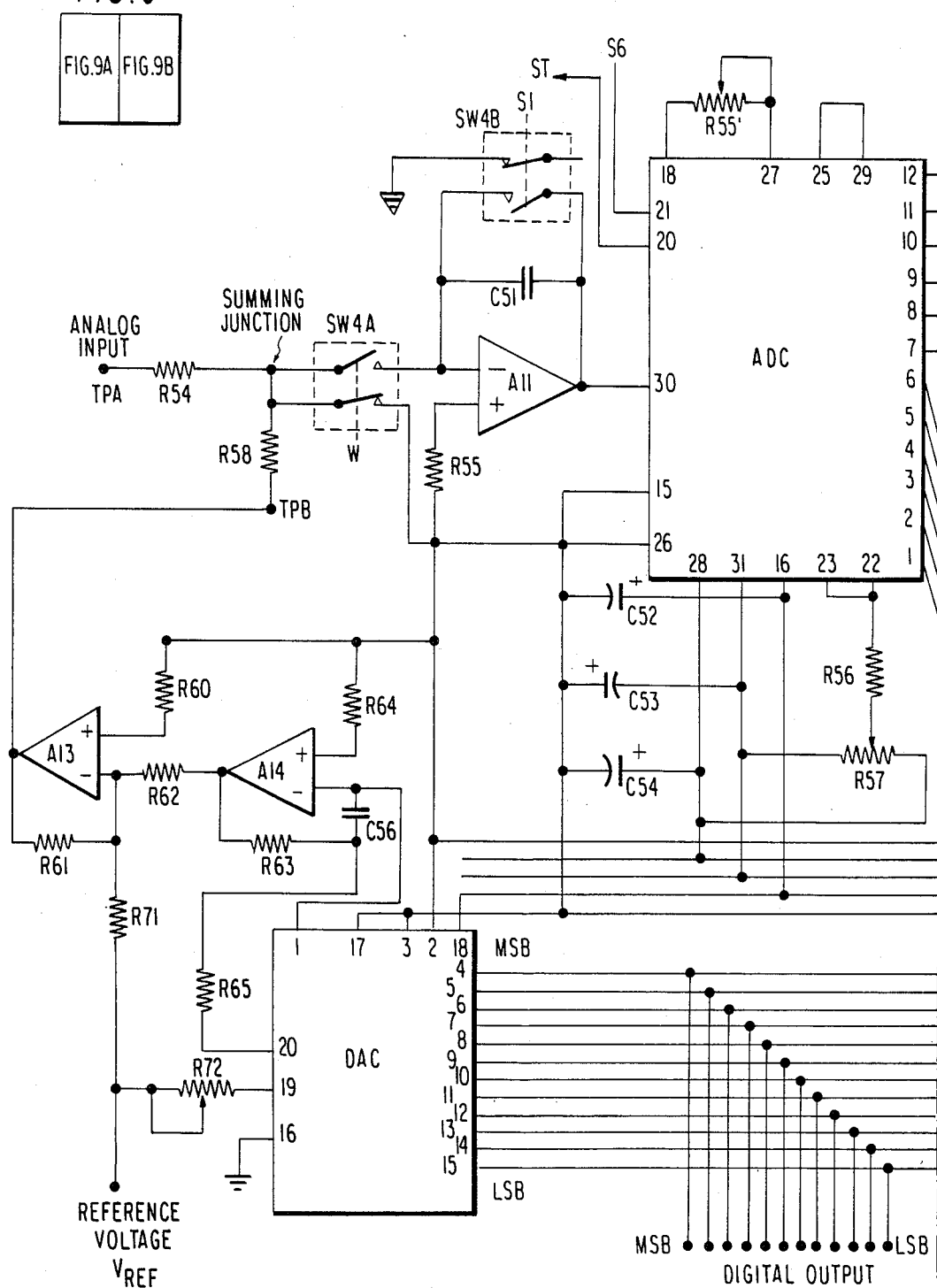

SIGNAL CONDITIONER FOR ELECTROMAGNETIC FLOWMETER

This is a continuation-in-part of application Ser. No. 506,479, filed June 21, 1983, and now abandoned.

DESCRIPTION

1. Field of the Invention

The present invention relates to a signal conditioner, more particularly a voltage to frequency converter, finding particular applicability in connection with electromagnetic flowmeters.

2. Background Art

As described in my U.S. Pat. No. 4,159,645, a constant source of problem in the electromagnetic flowmeter art is a low signal level produced by typical electromagnetic flow meters, whether of the probe or spool type. This low signal level, of the voltage output either from the electrodes (sometimes referred to as the transducer) of the flowmeter or from an associated preamplifier, requires the signal conditioning electronics to be able to focus on the signal of interest to the exclusion (or substantial exclusion) of spurious voltages introduced by noise and/or interference.

However, further complicating the problem of focusing in on the signal proportional to flow is the fact that in typical electromagnetic flowmeters (whether of the spool or probe type) the output signal Y (at either the electrodes or at the output of an associated preamplifier) is actually proportional to two quantities, the measured flow related quantity, X, and a variable factor A. Mathematically, we can write:

$$Y = kAX \quad (1)$$

where k is some constant of proportionality. The necessity to measure the measurand X, to the exclusion of the other factors actually exists in many practical applications. For example, in a spool type flowmeter, with a properly oriented magnetic field, the flow generated signal voltage V is actually given by:

$$V = dBu \quad (2)$$

where
- d is the pipe diameter,
- B is the magnetic induction,
- u is the mean flow velocity (averaged over the pipe's cross-sectional area).

Of course, we wish to focus in on the measurand u in equation 2, while and B is a variable factor and d is the proportionality constant. The magnetic induction B varies in magnitude, frequency and phase. One solution is to fix B against such variations, however, it is generally uneconomic to provide separate equipment to stabilize B. Therefore, the problem is to accurately determine u in the face of variations in B.

The same problem is present when attempting to measure volumetric flow rate Q. In this case, equation 2 can be rewritten as:

$$V = (4/\pi d) B Q \quad (3)$$

The concept is the same but the proportionality factor now is $4/\pi d$.

The same problem is present with the probe type electromagnetic flowmeter. In this case, the flow generated voltage is:

$$V = (3\mu_0 / 2\pi d^2) M u \quad (4)$$

where
- u is the mean stream flow velocity,
- M is the magnetic moment (generally produced by an alternating electromagnetal solenoid),
- $(3\mu_0/2\pi d_2)$ is the proportionality constant.

The user would like to have an output signal from the flowmeter, whose frequency varies as flow velocity u or volumetric flow rate Q, even though the magnetic induction B or moment M is also subject to variations.

The prior art illustrates various voltage to frequency converters, and the present invention is an improvement in such voltage to frequency converters, with specific application to the electromagnetic flowmeter.

In conventional voltage to frequency signal conditioners (or converters) a null balance system is used in which the feedback is proportional to the variable factor and the conditioner's output frequency. As applied in electromagnetic flowmeters, the magnet current is considered to be proportional to the magnetic induction B. A reference voltage, proportional to the magnet current, is generated. The reference voltage is chopped at the rate of the conditioner's output frequency. The duration of each chopping pulse is closely regulated: the chopped voltage is low pass filtered, the average voltage thus fed back is proportional to the chopping frequency and to the reference voltage. In such conditioners, it is important to regulate each chopping pulse's duration (using, for example, a one shot, or for greater accuracy using an arrangement with a crystal controlled clock).

Chopping requires the use of a large number of short pulses to meter the feedback; it causes cumulative errors owing to accumulated deviations or operating tolerances in the analog switch's turn-on time and turn-off time. Each turn-on or turn-off also injects noise into the system. Further, the chopped feedback voltage also requires a low pass filter element in the feedback to prevent saturation in the high forward gain portion of the system. Since it is in the feedback circuit, the filter element must be highly stable. One example of such a voltage to frequency conditioner in the electromagnetic flowmeter technology is shown in the Grebe, Jr. et al U.S. Pat. 4,309,909.

Shauger, in U.S. Pat. No. 4,339,958, shows a variation of a voltage to frequency converter which finds application in the electromagnetic flowmeter technology. Shauger has eliminated the chopping function and the low pass filter. Shauger actually shows two parallel forward channels, merging into a common forward channel and terminating at a clock. In one of the parallel channels, Shauger periodically samples the voltage from the electromagnetic flowmeter, more particularly from the output of an amplifier 18. This sampled voltage is used as the driving voltage in an integrating amplifier. Simultaneously, and in a parallel channel, Shauger integrates a sample of a reference voltage. At the conclusion of the integration, in both parallel forward channels, he inverts the output of the integrated reference channel and applies the inverted output to the integrator which had previously integrated the voltage sampled from the electromagnetic flowmeter. Accordingly, the integrator output now changes slope, beginning at the point at which the electromagnetic flowmeter voltage had been integrated up to, and decreasing at a rate determined by the integrated (and inverted) reference voltage. The measurand is actually determined by the time taken for the integrator's output to reach zero. Accordingly, while Shauger does not employ chopped feedback, he does require plural switching in the forward channel, for each sample. This requires high bandwidth and correspondingly expensive equipment. Furthermore, any errors in timing of switch operation can also lead to errors in the output. It is therefore one object of the present invention to provide a voltage to frequency converter particularly adapted for use with electromagnetic flowmeters. It is a further object of the present invention to provide such a voltage to frequency converter which is not subject to the difficulties exhibited in prior art voltage to frequency converters when associated with electromagnetic flowmeters. It is still another object of the present invention to provide such a voltage to frequency converter for use with electromagnetic flowmeters which does not chop the feedback. It is still another object of the present invention to provide a voltage to frequency converter which employs a minimum amount of switching to minimize the introduction of timing errors and interference introduced by such switching. It is still another object of the present invention to provide a stable accurate voltage to frequency converter which is adapted for use with electromagnetic flowmeters and which is capable of compensating for variations in magnetic induction B.

These and other objects of the invention are achieved in a manner hereinafter set forth.

SUMMARY OF THE INVENTION

The invention meets these and other objects by eliminating the function of chopping the feedback signal (and the corresponding necessity for a low pass filter) as well as eliminating the multiple switching operations in the forward path per cycle of operation. All this is accomplished by gating the feedback signal into the forward channel just once per ½ cycle. The feedback signal is gated to a summing junction to which is also applied a signal proportional to the output of the transducer or an associated pre-amplifier. The algebraic sum of the signals applied to the summing junction is sampled, and the sample is integrated, thus eliminating the necessity for an explicit low pass filter. Because the summing junction is the input to an integrating sampler, the conditioner can operate on a charge balance principle as opposed to a voltage balance. In a first embodiment of the invention, the feedback signal is a charge feedback which flows into the summing junction at a constant rate, e.g. proportional to magnetic induction B; the duration of the feedback (called the feedback window) is modulated so that it is proportional to the conditioner's output frequency F. This is accomplished by counting up in an up/down counter at the frequency F for a fixed duration; then counting down at a frequency that is a harmonic of the power mains frequency. The time required for countdown is the duration of the feedback window and is thus used to develop the gating signal for gating the feedback to the summing junction.

A variation of the invention simply counts up in a counter as before. At the conclusion of the up count, the digital number in the counter is latched to a multiplying digital to analog converter (hereinafter DAC). The DAC output controls the rate at which the feedback charge flows into the summing junction. The rate is thus proportional to the output frequency F, and thus there is no need to modulate the feedback window duration.

In both arrangements, an additional multiplying DAC may be placed in series with the reference voltage. The digital setting of this additional DAC may be set with a thumb wheel switch which can be used to digitally select the flowmeter scale factor.

Rather than establishing a reference voltage as related only to magnetic induction B, alternate apparatus provides an accurate reference voltage which is proportional to both the magnetic induction B and to the power main's frequency FO. With this modification, we can eliminate the constant duration required for the up counting function (since this requires an accurate timing device such as a crystal controlled clock) and instead we can count up for a duration that is proportional to the power main period.

Although the previous embodiments of the invention referred to operate on a current integral (charge), it is also within the scope of the invention to operate on a voltage integral, e.g. volt seconds.

Thus, the invention provides a stable, accurate voltage-frequency converter for use with an electromagnetic flowmeter, which flowmeter includes means generating an electromagnetic field proportional to a magnetic induction B, comprising:

(a) a summing junction (operating on voltage or current) coupled to a flowmeter generated analog voltage, (b) a first sampling switch and a forward processing chain with suitable gain coupled to said summing junction via said first sampling switch, (c) said forward processing chain including,
  (i) an integrator,
  (ii) a detector (preferably phase sensitive), and
  (iii) a VCO for producing a VCO output at a frequency directly proportional to said flowmeter generated analog voltage, (d) feedback means responsive to said VCO output and to a magnet signal related to said magnetic induction B to couple a quantity (a charge quantity for a current junction; a volt-seconds quantity for a voltage junction) to said summing junction which is related to a product of said magnet signal and the frequency of said VCO output, (e) a counter, means phase locking said counter to a power mains frequency, means responsive to said counter for generating control signals for operating said detector and said first sampling switch.

In a first embodiment of the invention, an up/down counter in the feedback chain is driven by the VCO to count up at a rate which is related to the output of the VCO, e.g. the frequency F. The up counting operation proceeds for a fixed duration. A down count of the up/down counter is then effected at a frequency which is a harmonic of the power main's frequency. The borrow output of the up/down counter is used to control a second sampling switch so that the second sampling switch is closed for the period required for the duration of the down count. In this way, the second sampling switch is closed for a time proportional to the frequency F. A voltage coupled to the second sampling switch is proportional to the magnetic induction B so that a quantity is transferred proportional to the product of B and F.

In a first variation of the invention, the up count operation proceeds as before, and at the conclusion of the up count, the digital number in the counter is latched to a multiplying DAC. The other input to the DAC is, what in the other embodiments of the invention is the fixed reference voltage, and thus the output of the DAC is a voltage proportional to the product. This produces the same result but eliminates the second sampling switch.

In still another variation, the up/down counter is driven by the VCO output, however it counts up for a duration of time which is controlled by the power main's frequency. Accordingly, the count reached is proportional to VCO output frequency F as well as the power main's period or 1/FO. The fixed reference voltage, previously proportional to B, is controlled to be proportional to B×FO. This compensates for the proportionality factor 1/FO in the count. Now we either use the DAC to produce our feedback signal to the summing junction or use the second sampling switch. In either case, we have eliminated the necessity for timing out the fixed period of up counting.

In an alternative implementation, the voltage-to-frequency conversion is omitted and the analog voltage output from the summing junction is first integrated in an analog integrator, converted to digital form in a sampling A/D converter, a digital phase-sensitive detector and a digital integrator, with the integrated digital voltage then being converted back to analog to generate the feedback signal to the summing junction.

BRIEF DESCRIPTION OF THE DRAWINGS

The present invention will now be described in further detail so as to enable those skilled in the art to make and use the same in the following portions of the specification when taken in conjunction with the attached figures of drawing in which like reference characters identify identical apparatus and in which.

DETAILED DESCRIPTION OF PREFERRED EMBODIMENTS

Figure 1A:
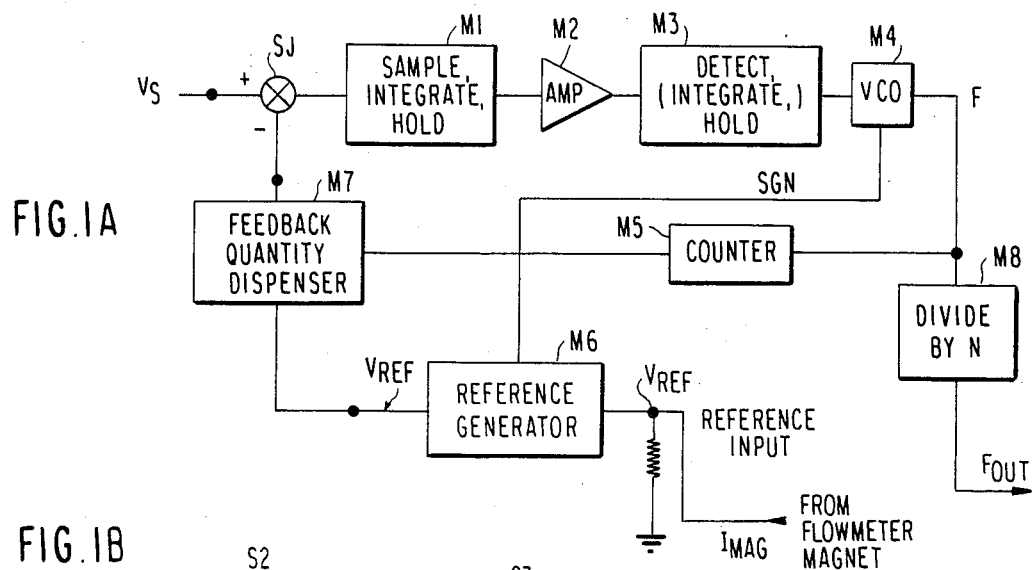
FIG. 1A is a block diagram which illustrates the invention, and is applicable to a plurality of the embodiments described hereinafter.

FIG. 1A illustrates in block diagram fashion several of the components of the invention and their interrelationship. Briefly, the output voltage from the sensing electrodes or an associated preamplifier is available at the terminal $V_s$, and forms one input to a summing junction SJ. The other input to the summing junction SJ is provided by the feedback quantity dispenser M7, the inputs to this module will be described hereinafter. The net result from the summing junction SJ is applied as an input to a sample integrate and hold module M1. We select the gain level of the integrator so that saturation does not occur during the course of the integration and as a result the final held value is meaningful. The output of this module is provided to the gain module M2; this module is optional. Serially connected to module M2 is the detect (integrate) and hold module M3. The integration stage in module M3 is also optional. The output of module M3 drives the VCO which forms module M4, and converts the input voltage to an output frequency F. In some circumstances, if we wish to handle bidirectional flow, we must provide a meaningful representation for a negative input to module M4 since negative frequency is not a meaningful term. One solution is to provide two outputs for module M4, one output carrying a signal whose frequency F represents an absolute value of flow, and the other output port a binary signal SGN indicating direction of flow. Other solutions are also possible, e.g. a VCO which outputs a square wave of a unity peak to peak amplitude and mean value of ½ (the amplitude at the square wave alternates between 0 and +unity), or a square wave with unity peak to peak amplitude and mean value of −½ (alternating between 0 and −unity). Other solutions are described below. In any case, one element of the module M4 is a conventional VCO wherein the input voltage is DC and non-negative. Thus, in order to handle bi-directional flow, typically the module M4 includes a comparator to sense the sign of the input voltage, generate the output signal SGN, and provide a positive input to the VCO element.

Module M1—sample, integration, hold—as such is essential. Its output, at the conclusion of integration, is an alternating voltage $V_{conclusion}$ that is proportional to the integral of the inputs to the summing junction SJ. The duration of the hold is sufficiently long to enable operation of the ensuing modules. Modules M2, M3, and M4 are collectively essential as far as input and output function, but they might be implemented in other ways. For example, basically we need a module, $M_{combined}$, whose output is a frequency F which is proportional to the peak-to-peak value of $V_{conclusion}$. The block diagram of FIG. 1A shows one way of articulating $M_{combined}$ into M2, M3, and M4. There are other ways of accomplishing this overall, combined function (e.g., a digital implementation of this as well as other operations cited in FIG. 1A).

The output signal of frequency F (corresponding to flow) is provided to a counter module M5 which counts the pulses of frequency of F over some interval of time. In one version, the counter M5 only counts up and latches the terminal count to a multiplying DAC in module M7; alternatively, the counter M5 can comprise an up/down counter element which strobes module M7 for reasons which will become apparent hereinafter.

Figure 2:
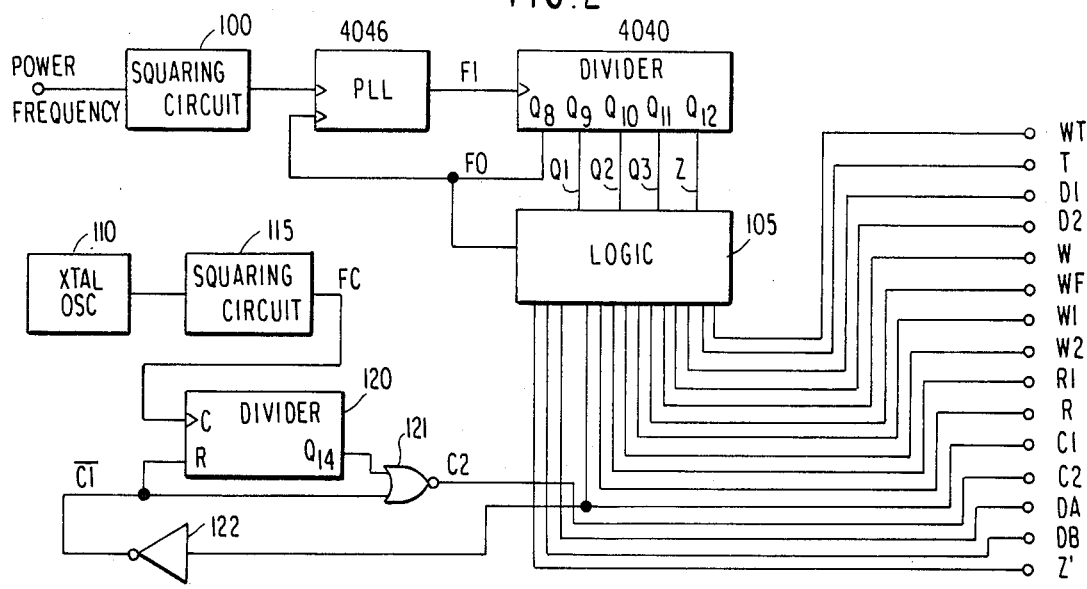
FIG. 2 illustrates in schematic fashion other apparatus used to generate selected ones of the control signals employed in the apparatus shown in FIGS. 1A and 1B.

A timing module (not illustrated in FIG. 1A) provides strobes to all the other modules except module M4. The unillustrated timing module (a block diagram of which is illustrated in FIG. 2) provides apparatus to periodically reset module M5 and for determining the up count duration, resetting and windowing the module M1, timing the holding element of M3 (as well as resetting and windowing the second integrator in module M3, and timing a phase sensitive detector, if employed), providing reset and enabling strobes to the module M7 as described below, and, if necessary, providing reset, enabling and windowing strobes to the module M6.

Module M7, the feedback quantity dispenser, is responsive to two inputs, one from the module M5 and one from the module M6, and meters, to the summing junction SJ, the appropriate quantity (ampere seconds or volt seconds) in accord with information from the timing module, the counter module and SGN information. The main purpose of the module M7 is to eliminate variations in the frequency F arising from variations in magnetic induction B.

The information for eliminating these variations is provided by the reference generator module M6. In its simplest form, this module accepts a voltage proportional to the current through the flow meter magnet ($V_{ref}$) and scales it to an appropriate value, multiplies it by the appropriate sign (depending on SGN). A more sophisticated reference generator produces a reference voltage that is proportional to the magnetic induction B and to the power main's frequency FO, alternating in sign depending on SGN.

To ensure the generality of FIG. 1A, we have provided a divider module M8 to provide a scale factor N relating to the output of the frequency F of the VCO to the ultimate output frequency of the instrument $F_{out}$.

Figure 1B:
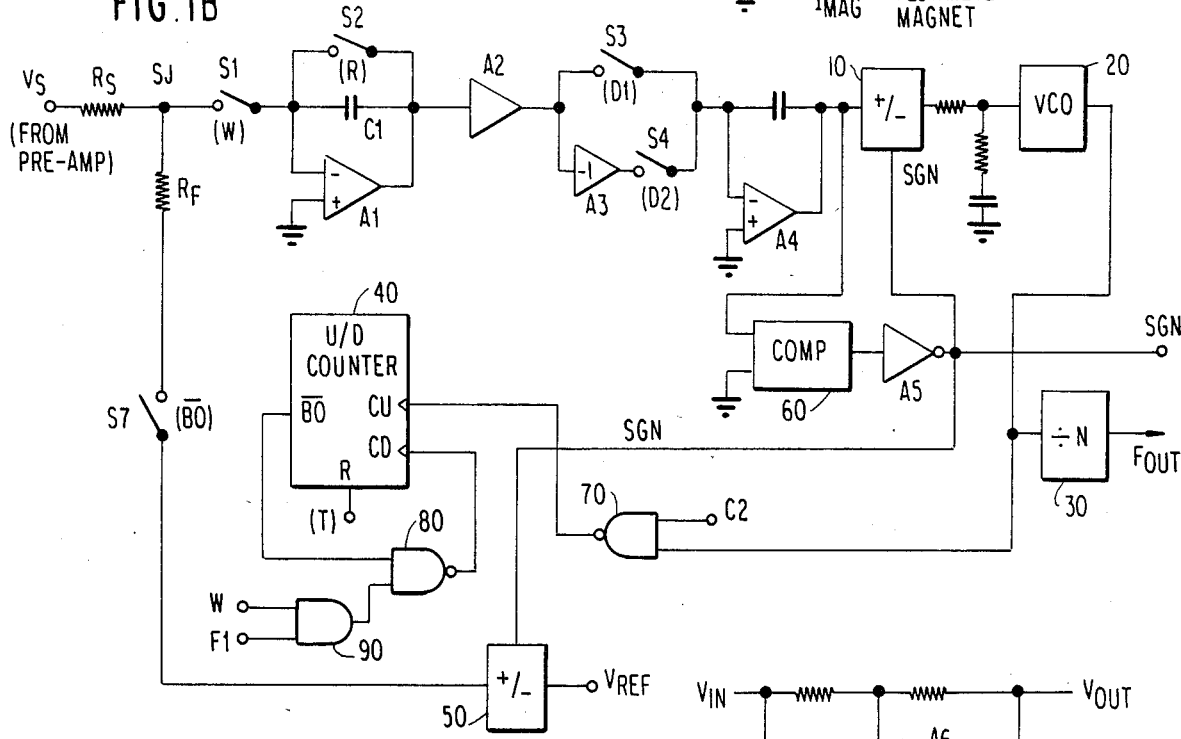
FIGS. 1B and 1C illustrate in schematic fashion a first embodiment of the invention in which the feedback loop balances a current integral, e.g. charge.

FIG. 1B is a schematic of the forward and feedback channels of a voltage/frequency converter embodying the present invention. FIG. 1C is a detail of the $+/-$ circuit which is one element of FIG. 1B. As shown in FIG. 1B, there are three significant ports, the signal input is at $V_s$, from the transducer (electrodes of the electromagnetic flowmeter) or the output of an associated pre-amplifier. The reference voltage input $V_{ref}$ is applied at a second port, and the frequency output at the third port $F_{out}$. In the event that the flowmeter is to respond to forward and reverse flow, then there is a second terminal SGN in the third port digitally indicating (via a binary signal) the direction of flow.

The signal input $V_s$ (proportional to both the measurand u and the variable factor B) may be the result of preconditioning the flowmeter's signal by a suitable pre-amplifier to transform the impedance level such that a low impedance output may be presented. The signal $V_s$ faithfully reproduces the transducer signal with negligible amplitude or phase distortion.

$V_{ref}$ is a voltage kB proportional to the variable factor B. The output $F_{out}$ is a signal whose frequency is related to the measurand u. Industrial practice calls for a maximum $F_{out}$ of about 10 KHz. Operation of the invention will generally call for a considerably higher output frequency, F; a scaler or frequency divider 30, is interposed to make the two frequency regimes compatible.

The flow meter generated analog voltage $V_s$ is coupled through a resistor $R_s$ to a summing junction SJ. The junction SJ is coupled through a first sampling switch $S_1$ to a forward processing chain.

In this description, we refer to switches $S_1$, $S_2$, etc. These are illustrated as mechanical switches but that is for convenience only. In practice, electronic switches are used; in that regard the control signals to operate the switches are identified and the production of these control signals is described, below. The forward processing chain includes, as shown in FIG. 1B, an integrating stage (associated with the amplifier $A_1$), a gain stage (if required, associated with the amplifier $A_2$), a phase sensitive detector (associated with the amplifier $A_3$), a second integrating stage (associated with the amplifier $A_4$). The output of the last stage is coupled as an input to a VCO 20. In the event that the flow meter is subject to bidirectional flow, a $+/-$ circuit 10 (and associated comparator 60 and amplifier $A_5$) is inserted between the output of the last stage and the input to the VCO 20 to ensure that the VCO 20 receives an input voltage of the appropriate polarity.

The output of the VCO 20 (scaled by the divider 30, if necessary) is a signal whose frequency $F_{out}$ is proportional to the measurand u. The manner in which the variable magnetic induction B has been removed is provided by the feedback chain.

As shown in FIG. 1B, the output of the VCO 20 is coupled through a gate 70 to the up counting input of an up/down counter 40. The down counting input is coupled from gates 80 and 90, which are provided with control signals described hereinafter. The up/down counter 40 produces its borrow output ($\overline{BO}$) which is used to control a second sampling switch $S_7$. The input to this switch is provided by the $+/-$ circuit 50, the input to which is $V_{ref}$.

FIG. 1C shows the internal details of the $+/-$ circuits 10 and 50. More particularly, an amplifier $A_6$ has its inverting input coupled through a resistor to an input terminal $V_{in}$. The non-inverting input to the amplifier $A_6$ is coupled via a parallel resistor to the same input terminal. However, the non-inverting input may be grounded through a switch $S_6$ which is controlled by a signal SGN. The output of the amplifier $A_6$ is coupled to the terminal $V_{out}$. It should be apparent that when the signal SGN is active (the switch $S_6$ is closed) the output at $V_{out}$ is the inversion of the input at $V_{in}$, and vice versa. The signal SGN is developed by the comparator 60, which compares the output of the last stage of the forward processing chain with a fixed reference (e.g. ground). In this fashion, if the polarity of the output signal of the last stage goes from positive to negative, the signal SGN changes state and the output of the $+/-$ circuits 10 and 50 also change polarity. Of course, if the output of the last stage of the forward processing chain is positive, so is the output of the $+/-$ circuit 10, the output of the $+/-$ circuit 50 is negative, and vice versa.

FIG. 1B also shows that the switches $S_1$ through $S_4$ are controlled by control signals W, R, $D_1$ and $D_2$; before further describing the operation of the circuits shown in FIG. 1B, these and others of the control signals will be described.

Figure 3:
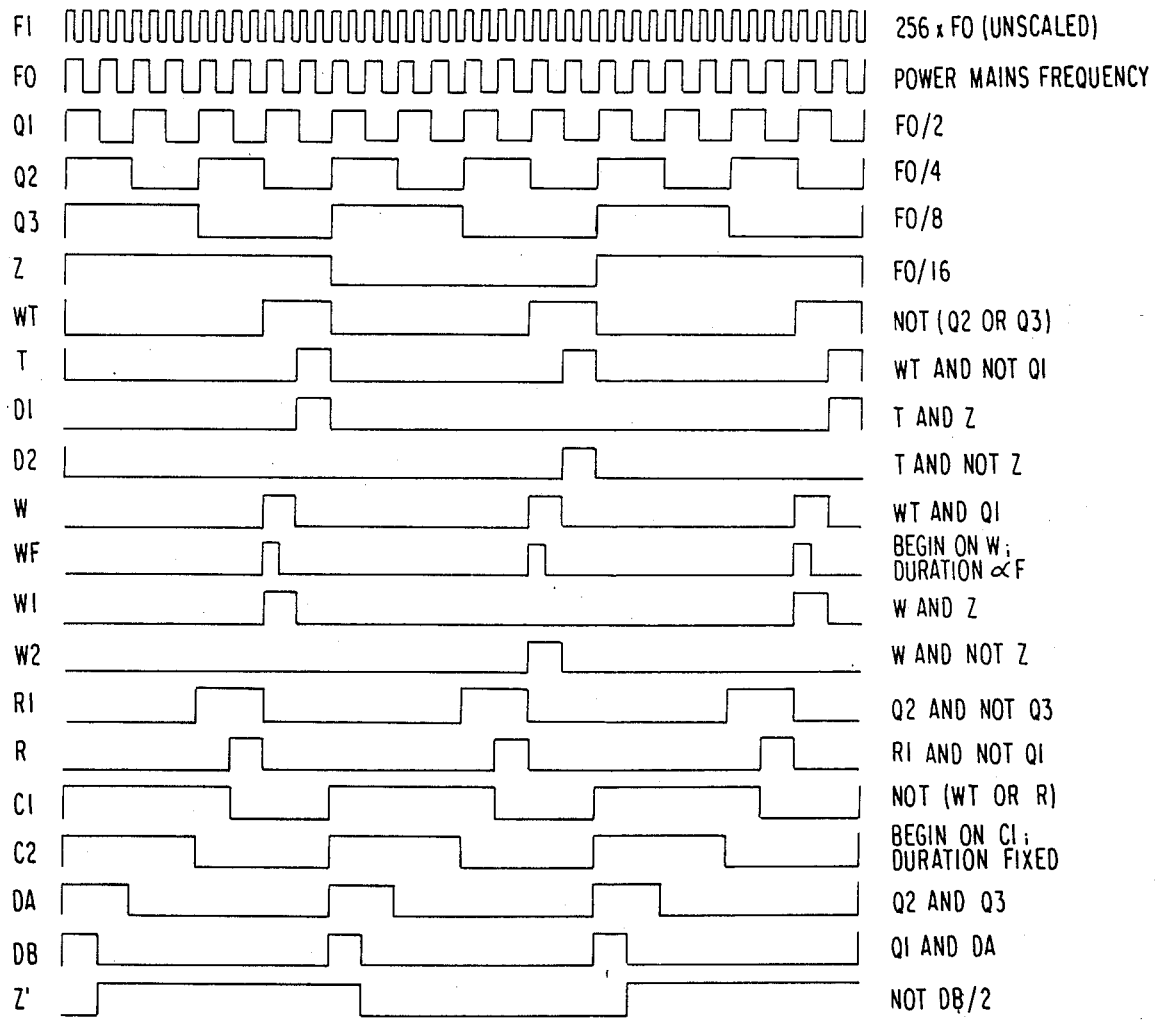
FIG. 3 is a timing diagram showing the relationship between the control signals developed as shown in FIG. 2.

The control signals are shown in FIG. 3.

FIG. 3 illustrates a number of waveforms, at the left the waveform's designation is given, and at the right each waveform is defined either in absolute terms or relative to another of the waveforms in FIG. 3.

F0 is a square wave that is typically phase locked to the power main's frequency (e.g. in the neighborhood of 50–60 hertz). This is sometimes referred to as the principal frequency.

F1 is a frequency which is suitable for use in counting down to produce F0. In practice, this may be a multiple such as $2^8$ times the frequency of F0. This is sufficient, if bidirectional flow is encountered, to give a resolution of about 1 part in 1000. Although F1 may typically be $2^8$ times the frequency of F0, it is shown as twice the frequency in FIG. 3 only for convenience in illustration.

Referring briefly to FIG. 2, a typical schematic is shown for generating the several waveforms shown in FIG. 3. It should be understood that the particular arrangement employed in FIG. 2 forms no particular part of the invention, and other equivalent arrangements will be apparent to those skilled in the art. As shown in FIG. 2, the power frequency is input, at the terminal at the left, to a squaring circuit 100. The output of the squaring circuit 100 is provided as the timing input to a phase locked loop or PLL (CMOS 4046). The output of the PLL is a signal at F1, and this provides the timing input to a divider, for example a twelve stage divider such as CMOS 4040. Stages $Q_8$–$Q_{12}$ of the divider 4040 are illustrated. These five stages of the divider provide signals designated as F0, Q1, Q2, Q3 and Z, respectively.

The signal Z (the output of the twelfth stage of the divider 4040) is a square wave which can be used as the alternation frequency of the flowmeter. With use of this frequency, the flowmeter can be either an alternating flowmeter (where the induction is either $+B_0$ or $-B_0$) or a switched flowmeter (where the induction is $+B_0$ or 0).

These signals are input to a logic unit 105 which can be used to develop the other control signals shown in FIG. 2. Rather than illustrating a logic unit 105 in detail, the relationship between the input and outputs (defining the particular type of logic which can be employed as should be evident to those skilled in the art) is provided. Several of these control signals which are pertinent to a description of the signal conditioner are now described.

D1 and D2 are used in the phase sensitive demodulator (to operate switches $S_3$ and $S_4$).

The signal W (used to operate the switch $S_1$) is the integrating sampler window. This sampler repeats every ½ cycle of the Z signal. When using square wave magnetic induction it is desirable to have W occur as late as possible in every ½ cycle of Z. In the basic form of the invention, the optimum location for W would be shifted back to the position of the strobe T. However, to employ W in certain variations of the invention, we show W and some of the other strobes in a somewhat less than ideal position.

WF is the feedback window (identical to $\overline{B_0}$). It commences at the same time as W, but its duration is controlled to be both proportional to the output frequency (F) and not longer than W. As a practical matter, WF may commence prior to the onset of W, but the portion earlier than the beginning of W will be seen to be irrelevant since the integrating sampler takes into account signal and feedback only to the extent that they exist within the bounds of W.

W1 is the time used to connect the sampled reference voltage to the signal conditioner. The reference voltage is presented during the feedback window W. W1 enables one polarity of the feedback voltage to be presented when Z is in one of its two binary states. W2 is virtually identical in function to W1, but it is used to enable an opposite polarity of the reference voltage to be presented when Z is in its other binary state.

R is the reset strobe for the integrating sampler $A_1$. As will be described, during the presence of R, the up count has reached its maximum state and is static so that the counter binary state (optionally a BCD counter may be used) may be latched if a digital output is also desired.

C2 gates the conditioner's output frequency F to the up counter. It commences at the fall of the demodulator strobes D1 and D2. Strobe C2's duration is fixed so that the count up duration is constant. C1 is a strobe which is used in lieu of strobe C2 in that variation of the invention where the up count is not timed out so as to have a fixed duration.

DB is the reset strobe used in a variation of the invention which employs a reference voltage integrating sampler for establishing a reference voltage proportional to FO.

Z' is used in lieu of Z when we are employing the reference voltage integrating sampler. In that case, it is helpful to delay the magnet alternation slightly compared to the variations prescribed by Z.

FIG. 2 shows particularly how a crystal oscillator 110 is used with the squaring circuit 115 and divider 120, gate 121 and inverter 122 along with signal $C_1$ to produce the signal $C_2$.

The divider 120 can be a 14 stage CMOS 4020. Since the duration of C2 has an error of $\pm\frac{1}{2}$ cycle of FC, it is desirable to make the frequency FC as large as practicable and that necessitates the large number of stages in the divider 120 (14 is exemplary).

Returning now to describe the operation of the embodiment of the invention shown in FIG. 1B, we note that the first stage, built around the amplifier $A_1$ is an integrating sampler. The operative input is provided by the junction SJ during that period of time when the switch $S_1$ is closed (controlled by the signal W). Two charges flow to SJ, a first charge flowing through the resistor $R_s$ which is therefore proportional to the signal voltage $V_s$ and a charge flowing through the resistor $R_f$ which is therefore proportional to the voltage occurring at the output of the switch $S_7$.

Preferably, the control signal W has a repetition rate equal to the power main's frequency FO, or a sub-harmonic thereof (FO/2, FO/3, etc.). Under these circumstances, all power main's frequency noises (and their harmonics) result in a constant voltage occurring at the input to amplifier $A_2$. This constant voltage is then rejected by the phase sensitive demodulator (associated with the amplifier $A_3$ or an equivalent high pass filter). Accordingly, all FO "noise" is rejected from the conditioner at this early stage.

However, we can arrange it so that the "constant" portion of the input to stage $A_2$ is zero, and under these circumstances the subsequent phase sensitive detector need not then be carefully designed. To achieve this, we make the control signal W precisely equal to one or more periods of the main's frequency FO. As a result, the integral of FO (and any of its harmonics) over this period is exactly zero. Accordingly, the control signal W is precisely equal to a period of the power main's frequency (or a sub-harmonic thereof).

The integrating sampler also uses but a single sampling switch $S_1$. This eliminates the need for carefully selecting balanced switches. Since we sample at twice the flowmeter operating frequency (one sample is taken for each polarity of the control signal Z), any noise associated with this switch and any drift in the amplifier $A_1$ will occur at double frequency and this will be rejected by the subsequent phase sensitive demodulator.

Present day integrators are notorious for drift. We provide a resetting function for the integrator via the switch $S_2$. As shown in FIG. 3, the integrator is reset just prior to W.

At the conclusion of W, the integrated output is held at the stage $A_2$ until the integrator is again reset. Except during that time when the control signal W or R is active, the voltage at the input to the stage $A_2$ is a square wave alternating at a frequency Z with an amplitude proportional to that of the net charge flowing during W, to the junction SJ.

Although coherent power main's noises should be integrated out by the time the window W is completed, during the course of the window W, the partially integrated value of such noise can be exceedingly large especially since the instrument is often located in industrial environments. However, during the integration process, we rely on the integrator remaining in linear operation, e.g. amplifier $A_1$ should not be allowed to saturate. This puts some constraint on the gain we can practicably achieve with the integrator. Accordingly, by limiting the gain of the integrator, it is sometimes necessary to provide additional gain (e.g. the amplifier $A_2$). While the output of the stage $A_2$ may saturate during the window (W), as long as it is out of saturation at the conclusion of W, operation will proceed. Thus, stage $A_2$ is optional.

The phase sensitive demodulator, which transfers the output of the stage $A_2$ to the input of the stage $A_4$ provides for phase sensitive rectification. During that portion of time when the control signal Z is in one state (for example Z=1), the output of the stage $A_2$ is transferred directly to the input of stage $A_4$ via the switch $S_3$. During the opposite phase (for example when Z=0), then switch $S_3$ is open and switch $S_4$ is closed, inserting the inverter $A_3$. The output of the phase sensitive detector forms the input to the fourth stage which is an integration stage associated with amplifier $A_4$. The output of the fourth stage is the continuous time integral of the voltage that exists at its input, the input is of course the output of the phase sensitive detector which is the phase sensitive detected voltage during D1 and D2, and has a zero voltage at other times. At equilibrium, with this second integrator in the loop, a zero charge balance is maintained at SJ and an average voltage of zero is maintained at the output of the sampling integrator $A_1$, except perhaps for the effects of component imperfections. The steady integrated voltage at the output of the second integrator ($A_4$) is directly proportional to the input flow voltage $V_s$. The use of a second integrator is not essential, it can be replaced by a low pass filter (a simple RC single pole low pass filter). With such a filter, at equilibrium the voltage stored on the filter's capacitor is constant (except perhaps during D1 and D2) at a voltage that is proportional to the input signal voltage $V_s$. In the absence of the second integrator, however, at equilibrium the steady voltage at the output of the phase sensitive detector is not zero and the average alternating voltage at the output of the sampling integrator ($A_1$) is not zero since there must be a "error signal" (or a charge unbalance at SJ) which is amplified by the forward gain to yield the constant voltage at the output of the fourth stage.

As has been described, the $+/-$ circuit 10 is employed for the bidirectional flow case. If only unidirectional flow is necessary, the $+/-$ circuit 10 as well as the comparator 60 and amplifier $A_5$ can be eliminated. The purpose of these elements is to provide non-negative voltage at the input of VCO 20.

As another alternative, these components could be eliminated even in the presence of a bidirectional flow, if one were satisfied to have a non-zero frequency output for zero flow. If, for example, zero flow were indicated at the VCO by a frequency output of 5 KHz, maximum reverse flow could correspond to zero frequency from the VCO 20 and full forward flow could correspond to 10 KHz. This type of offset could be maintained by injecting an additional steady current into the summing junction of the amplifier $A_4$. However, in the invention so far described, zero flow corresponds to zero frequency from the VCO 20. Under these circumstances, the sign of the voltage at the output of $A_4$ is coherent with the sign or phase of the input voltage $V_s$. For example, if the output of $A_4$ is positive, then the output of the comparator 60 (SGN) is positive. Under these circumstances, the $+/-$ multiplier 10 acts as a unity gain amplifier and so presents a non-negative input to the VCO 20. Conversely, when the output of the fourth stage is negative, the $+/-$ circuit 10 acts as an inverter, and thus a positive voltage is still maintained at the input to VCO 20.

The VCO 20 requires a little comment. Since it is in the forward gain part of the loop, a high order of linearity is not important. In order to get enough up count (as discussed below) and thus resolution in the counting time available, it may be desirable that the maximum F be 100 KHz or higher. On the other hand, the instrument user generally does not like full scale output frequency to be greater than say 10 KHz. Accordingly, a ratio is established between $F_{out}$ and F via the scaler 30.

The output of the VCO 20 is one input to a gate 70, which is enabled during C2. The output of the gate 70 is coupled to the upcounting input of up/down counter 40 which may be, for example, a CMOS 40193. Preferably, however, in order to attain adequate resolution, a ten stage counter should be used. The 40193 is only a four stage counter, cascading several such counters to obtain ten stages is well within ordinary skill in the art.

The gate 70, as well as the associated gates 80 and 90, serve to have the counter begin at zero count and commence counting up during the fixed interval C2. At the conclusion of C2, the count is held (during R) and may be latched for separate handling if a digital output signal is desired (consider using the counter's BCD version CMOS 40192). Circuitry to latch the count during R is not illustrated.

The counter's borrow output ($\overline{BO}$) is one during the strobe T (since the counter is reset by the strobe T), immediately prior to the commencement of the up count interval C2. $\overline{BO}$ remains at this high level during the up count, remains at this level when the sampling window W is first turned on and goes to zero only when the down count has been completed. The feedback switch, $S_7$ is controlled by $\overline{BO}$ so that it is closed when the $\overline{BO}$ output is one and open otherwise. Note also that the charge flowing to SJ prior to the sampling window W is irrelevant since only the charge flowing during W takes part in the sampled integration. The feedback charge has thus been metered to SJ in an amount proportional to the output frequency F. In equilibrium, that charge will be balanced by the signal charge metered to SJ through the input resistor $R_s$.

The input to the switch $S_7$ is provided by the $+/-$ circuit 50, whose input is $V_{ref}$. The $+/-$ circuit 50 is just like the $+/-$ circuit 10 (see for example FIG. 1C) and serves the same kind of purpose. When reverse flow occurs and $V_s$ changes sign, the feedback current must also change sign.

As will be described below, the signal $V_{ref}$ is proportional to the magnetic induction B and can be termed the magnet signal. The feedback chain in the loop thus is responsive to the VCO output, via the gate 70 and the U/D counter 40, and is also responsive to the magnet signal (via $V_{ref}$ and the +/− circuit 50). By controlling switch S7, a quantity of charge is metered to the summing junction SJ which is related to a product of the magnet signal B and the frequency of the VCO output F.

More particularly, the feedback chain includes the counter 40 which is enabled to count up for a predetermined time, e.g. the duration of C2. The second sampling switch, S7, is controlled by an output of the up/down counter 40 (particularly the output $\overline{BO}$) and operates the second sampling switch to couple the magnet signal to the summing junction over a prescribed time, e.g. the time necessary for the up/down counter 40 to count, from the count attained during the period C2, to a zero count.

Although the description of FIG. 1B and 1C has been given in terms of a current balance, as has been previously indicated, voltage balance can be employed.

Figure 1D:
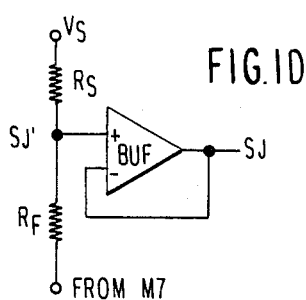
FIGS. 1D through 1F illustrate variations in which the feedback loop balances a voltage integral, e.g. volt seconds.

FIG. 1D illustrates an arrangement for operating the instrument on a voltage difference. As shown in FIG. 1D, a modified summing junction SJ' is coupled to a pair of resistors $R_s$ and $R_f$. The free terminals of the resistors are respectively connected to the voltage $V_s$, and the output of the module M7. SJ' is coupled to the positive input of a buffer amplifier, whose output is coupled to an inverting input. The output of the buffer amplifier is the summing junction SJ.

Figure 1E:
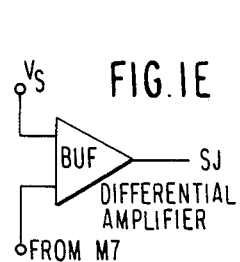
Figure 1C:
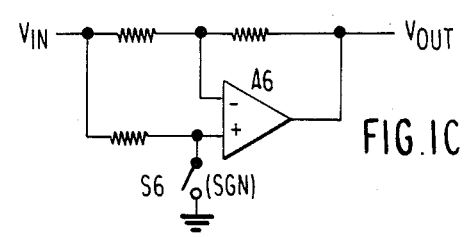

Alternatively, a differential voltage amplifier can be employed, as is shown in FIG. 1E.

Figure 1F:
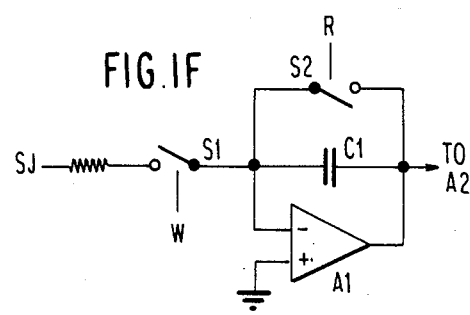

If either of the embodiments shown in FIG. 1D or 1E is employed, then the first stage of the processing chain takes the form shown in FIG. 1F.

Note that in connection with FIG. 1E, there is a phase reversal in the signal coming from module M7 (since it is connected to the inverting input of the buffer amplifier).

It should be apparent that the feedback circuit can be modified to account for this phase reversal.

Although the invention has been disclosed in connection with current summing or voltage summing, the current summing embodiments are preferred inasmuch as they require fewer components (the buffer amplifier is not required for the current summing embodiments).

Alternate Embodiment

Figure 4:
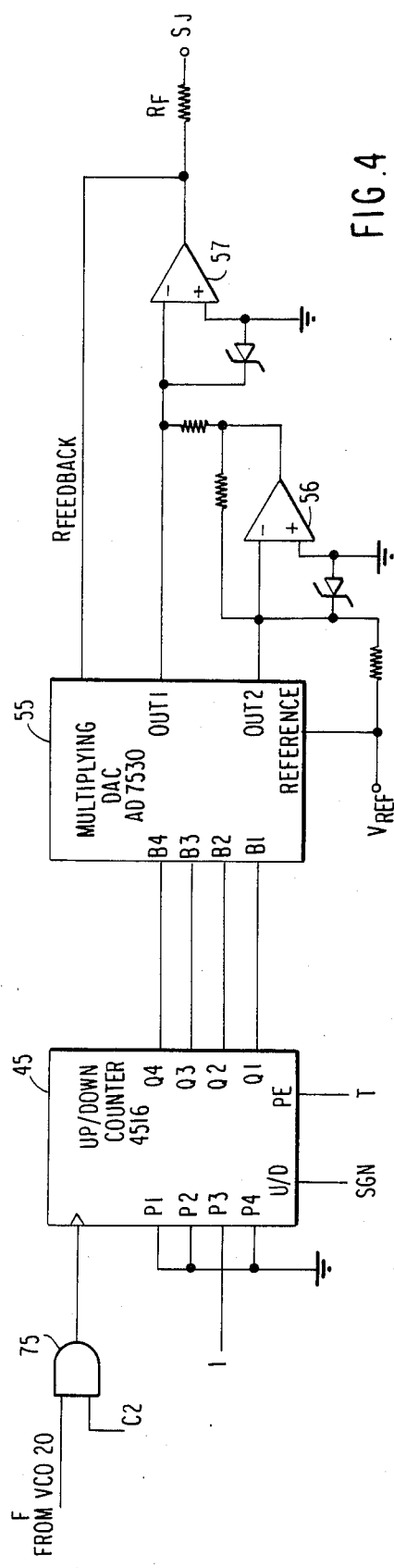
FIG. 4 illustrates the apparatus which can be used in lieu of the feedback chain of FIG. 1B to achieve bidirectional flow sensitivity without the necessity for the +/− circuit 50.

Precision operation in the feedback chain is critical. The +/− circuit 50, located in the feedback chain, can be improved. The +/− circuit 10 which is in the forward channel is quite sufficient. This improvement, for the feedback channel is shown in FIG. 4, thus the apparatus shown in FIG. 4 replaces elements 40, 50, 70, 80 and 90 as well as S7 (in other words, the feedback chain shown in FIG. 1B) with the gate 75, up/down counter 45, multiplying DAC 55 and associated amplifiers 56 and 57. Although the junction SJ is shown in FIG. 4, omitted from the showing is its connection to both the resistor $R_s$ and the switch $S_1$.

The multiplying DAC 55 is connected for bipolar operation; the binary coding is offset (to 0100 0000 0000 for a 12-bit multiplying DAC - 10 bits for magnitude, 1 bit for sign). The analog output of the DAC then varies between $+V_{ref}$ and $-V_{ref}(1-2^{-11})$.

To operate in this fashion, we employ the presettable feature of the up/down counter 45; during the strobe T it is preset to the same offset (0100 0000 0000) before up or down counting begins. The count is up if SGN (see FIG. 1B) is one, and down if SGN is zero.

Gate 75 replaces gate 70, but its inputs are the same, e.g. C2 and the output of VCO 20. The output of gate 75 is coupled to the clock input of the counter 45. The counter's U/D port senses SGN. The preset 0100 is effected by the strobe T, just prior to the onset of the counting strobe C2. It should be noted that FIG. 4 shows only four stages of the counter 45 and DAC 55; it should be understood that 12 stages are required in practice; those skilled in the art are quite capable of cascading counters and DAC's to provide the necessary 12-bit resolution. (However, the LSB/MSB terminology for the CMOS counter and the Analog Device's DAC is different—Q1 is the MSB stage in the CMOS counter, whereas Q1 is the LSB stage in the DAC. The convention adopted in FIG. 4 is that Q1 refers to the MSB stage for both components). For a description of operation of multiplying DAC 55 in FIG. 4, see "Data-Acquisition Databook 1982-Volume I Integrated Circuits", p. 10–49 (Analog Devices, Mass).

The operation of the invention employing the feedback chain shown in FIG. 4 should be apparent, however, it will be briefly described herein. It is a function of the feedback chain to produce a signal proportional to the product of the frequency F and the magnetic induction B. In FIG. 4 the count achieved by the up/down counter 45 is proportional to the output frequency F. The multiplying DAC 55 produces the product of this digital quantity with the reference voltage (which is itself proportional to magnetic induction B). In addition, the multiplying DAC 55 performs a digital to analog conversion function. Accordingly, we have eliminated the necessity for the switch S7.

Second Variation

Figure 5:
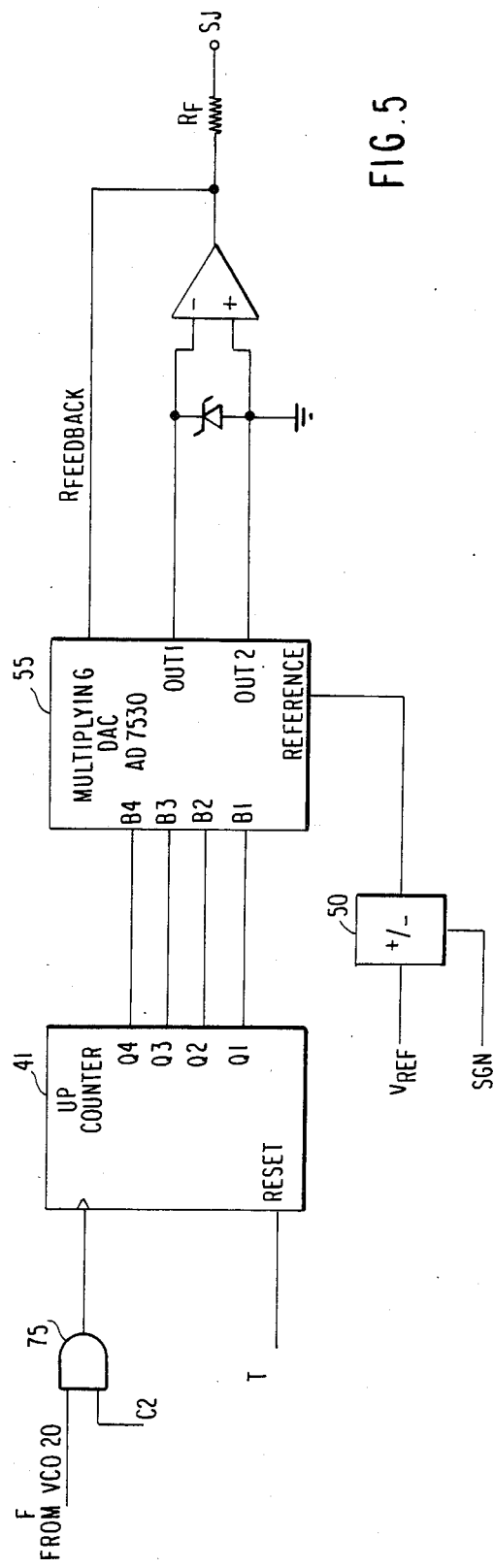
FIG. 5 illustrates the apparatus that can be substituted for the feedback chain of FIG. 1B to eliminate the necessity for the switch S7.

In the embodiment of the invention described in connection with FIG. 1B, we meter the feedback charge by applying a voltage $V_{ref}$ (with the appropriate polarity) to a switch which is closed for some proper fraction (up to 100%) of the strobe W which is determined by the frequency F of the VCO 20. Better practice dictates that the switch is closed for about 80% of W to allow some leeway before saturation. In this fashion, the feedback charge to the junction SJ is proportional both to the magnetic induction B (since $V_{ref}$ is proportional thereto) and to the frequency F (since the switch is only closed for a time proportional to this quantity). In this embodiment of the invention, however, we eliminate the switch S7 and instead develop a voltage which is both proportional to the magnetic induction B and to the frequency F. Accordingly, the feedback chain in this embodiment of the invention (as shown in FIG. 5) replaces the gate 70, 80 and 90 and the up/down counter 40 with an up counter 41 and a multiplying DAC 55. The +/− circuit 50 is employed as before, with the same input signals, except that its output is now coupled to the REFERENCE input of the DAC 55. Gate 70 has been replaced with gate 75, although it has the same two input signals, and its output is coupled to the clock input of the up counter 41. The T strobe is used to reset the up counter 41 prior to the counting interval C2. It should be noted here, that just as in the case with FIG. 4, we illustrate four stages of the counter 41 and DAC 55, but in practice more than four stages are used, twelve stages for example to give a resolution of 1 part in 1000.

Rather than employing the feedback switch S7, the DAC controls the rate of charge flow into SJ in proportion to the conditioner's output frequency F. No duty cycle modulation of the feedback current is required; feedback charge flows during the entire integrating sample W.

After being reset (T) and at the onset of C2, the frequency F is gated to the counter's clock input; counting continues for a fixed duration, e.g. C2. Then the digital count is held until the counter reset occurs at the next T.

The stages of the up counter 41 are connected to the corresponding digital ports of the DAC 55. During the up count itself, increasing rates of feedback charge flow into SJ, but this is irrelevant since the integrating sampler ignores all charge flow except that occurring during the integrating sampling window W. After the up count is stopped, it remains static throughout the duration of the sampling window W. Accordingly, during W, feedback charge flows to SJ at the appropriate rate.

The feedback charge rate (the output of the multiplying DAC) is proportional to $V_{ref}$ presented to the REFERENCE port of the DAC. This reference voltage is, as usual, proportional to the flowmeter's magnetic induction B; but the sign of $V_{ref}$ must be changed in accordance with the state of SGN, and that function is accomplished by the $+/-$ circuit 50.

Third Variation

In the embodiments of the invention shown in FIGS. 1B, 4 and 5, the control signals employed are developed in the circuitry shown in FIG. 2 which includes a crystal oscillator 110 to develop the fixed time interval C2. The present variation of the invention eliminates the necessity for this oscillator.

Rather than relying on a fixed interval C2 (crystal controlled), we count up for the duration of a different interval C1 which is proportional to 1/FO. The count at the end of C1 is therefore proportional to 1/FO. Regardless of whether or not we use the duration modulated feedback window (FIG. 1B) or the feedback multiplying DAC (FIG. 4 or FIG. 5), the magnitude of the feedback is now proportional to the factor 1/FO. This factor can be compensated if we use a reference voltage that is directly proportional to FO.

Figure 6:
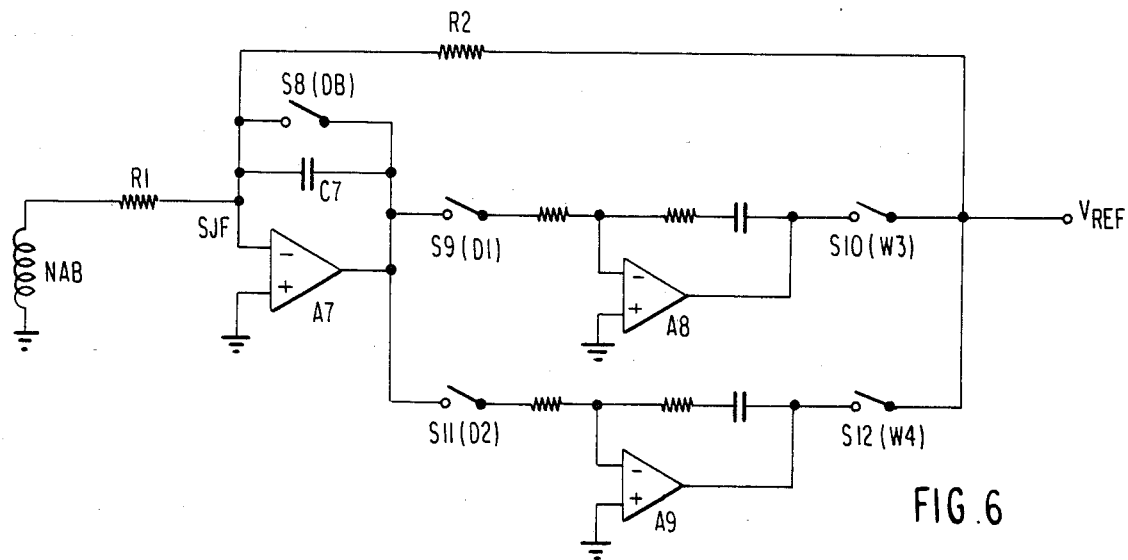
FIGS. 6-8 illustrate a circuit for generating a reference voltage which is proportional to not only magnetic induction B but to FO so that we can employ the strobe C1 in lieu of the strobe C2 allowing us to eliminate the necessity for the crystal oscillator 110 of FIG. 2.

FIG. 6 shows a reference generating circuit that will accomplish this. Accordingly, we can modify FIG. 1B by changing the input to gate 70 from C2 to C1, and deleting the $+/-$ circuit 50. The reference voltage is changed from $V_{ref}$ to $V'_{ref}$ (derived from the circuit shown in FIG. 6).

Referring now to FIG. 6, the input to amplifier A7 is a voltage from the coil labelled NAB (through the resistor R1). This voltage is generated via an inductive coupling with the flowmeter's induction B. We can, for example, put an N turn test loop of area A in the flowmeter magnet's air gap. The alternating flux produces an EMF of the form:

$$NAdB/dt \qquad (5)$$

Alternatively, we can place the primary of a mutual inductance M in series with the magnet current I. The changing current then produces, in the secondary, a voltage expressed as:

$$MdI/dt \qquad (6)$$

Since the magnetic induction B is proportional to the magnet current I, we have a voltage that is proportional to dB/dt.

The objective is for each ½ cycle of magnet alternation to have the sum of the charge flowing into SJF equal to zero. For the case of the square wave magnetic induction then, the charge $Q_1$ flowing from the inductive loop is:

$$\int_0^t (NA/R_1) \dot{B} \, dt = 2NA \, B_0/R_1 \qquad (7)$$

If $V'_{ref}$ is the result produced as shown in FIG. 6, then the charge $Q_2$ flowing to SJF through the resistor $R_2$ is:

$$V'_{ref} W1/R_2 \qquad (8)$$

where W1 is here meant to be the duration of the W1 strobe. Since at equilibrium the sum of the charges at SJF is zero, we have:

$$V'_{ref} = -(2NA \, R_2 \, B_0)/(R_1 W1) \qquad (9)$$

Since the duration of W1 is inversely proportional to FO, we meet our objective in that $V'_{ref}$ is directly proportional to FO.

The control signals shown in FIG. 2 remain the same except now the magnet alternation is controlled by Z' rather than Z (see FIG. 3).

The voltage produced by stage A7 is reset to zero before each ½ cycle of integration (switch S8, controlled by DB, provides for this resetting operation). At equilibrium, the integrated voltage at the output of stage A7 is driven to 0, but during the transient ½ cycles leading to equilibrium, the voltage at this point is transferred, integrated (with damping) and stored at either the output of stage A8 or A9. During the feedback window W2, the voltage at the output of stage A9 is presented to the output terminal (during every other ½ cycle) and the opposite polarity voltage is presented to the output terminal during W1 (during the alternate ½ cycle). As will become clear hereinafter, the strobes W3 and W4 are derived respectively from either W1 or W2 depending on the condition of SGN. More particularly, W3 is identical with W1 when SGN is of one polarity, at which time W4 is identical to W2. If SGN is of the opposite polarity, then W3 is derived from W2 and W4 is derived from W1. This is accomplished with the AND/OR select circuit shown in FIGS. 7 and 8. Accordingly, we have eliminated the need for the $+/-$ circuit 50 and now the output of FIG. 6, $V'_{ref}$ can be connected either directly to the input of switch S7 (FIG. 1A) or to the input of the multiplying DAC 55 (of either FIG. 4 or FIG. 5).

Figure 7:
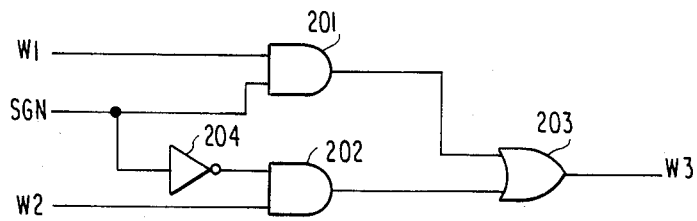
Figure 8:
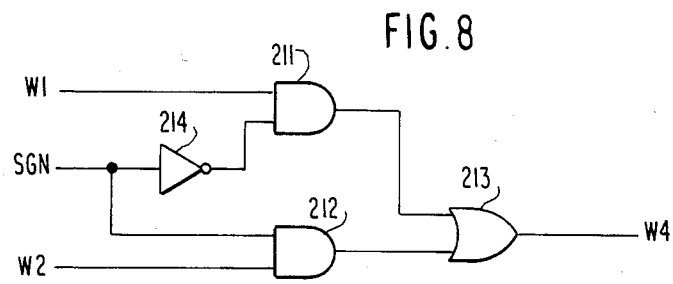

Finally, FIGS. 7 and 8 show how the strobes W3 and W4 are produced.

In the event that SGN is positive, then the gate 202 is disabled, as is the gate 211. Accordingly, strobe W3 is identical to W1 (see FIG. 7—and gates 201 and 203) and W4 is identical to W2 (see FIG. 8—gates 212 and 213). On the other hand, if SGN is zero then gates 201 and 212 are disabled. In that event, W3 is identical to W2 (see gates 202 and 203 in FIG. 7) and W4 is identical to W1 (see gates 211 and 213—FIG. 8).

In the embodiments described above, the analog input signal voltage is converted to a corresponsing frequency by VCO 20. The counter 40 then counts up the VCO output signal and counts down in accordance with a oower mains frequency to determine a duty cycle for the feeback sampling switch S7. However, it should be noted that the analog-to-frequency-to-digital operation could be instead performed in a straight analog-to-digital manner, as will now be explained with reference to FIGS. 9 and 10.

Figure 9B:
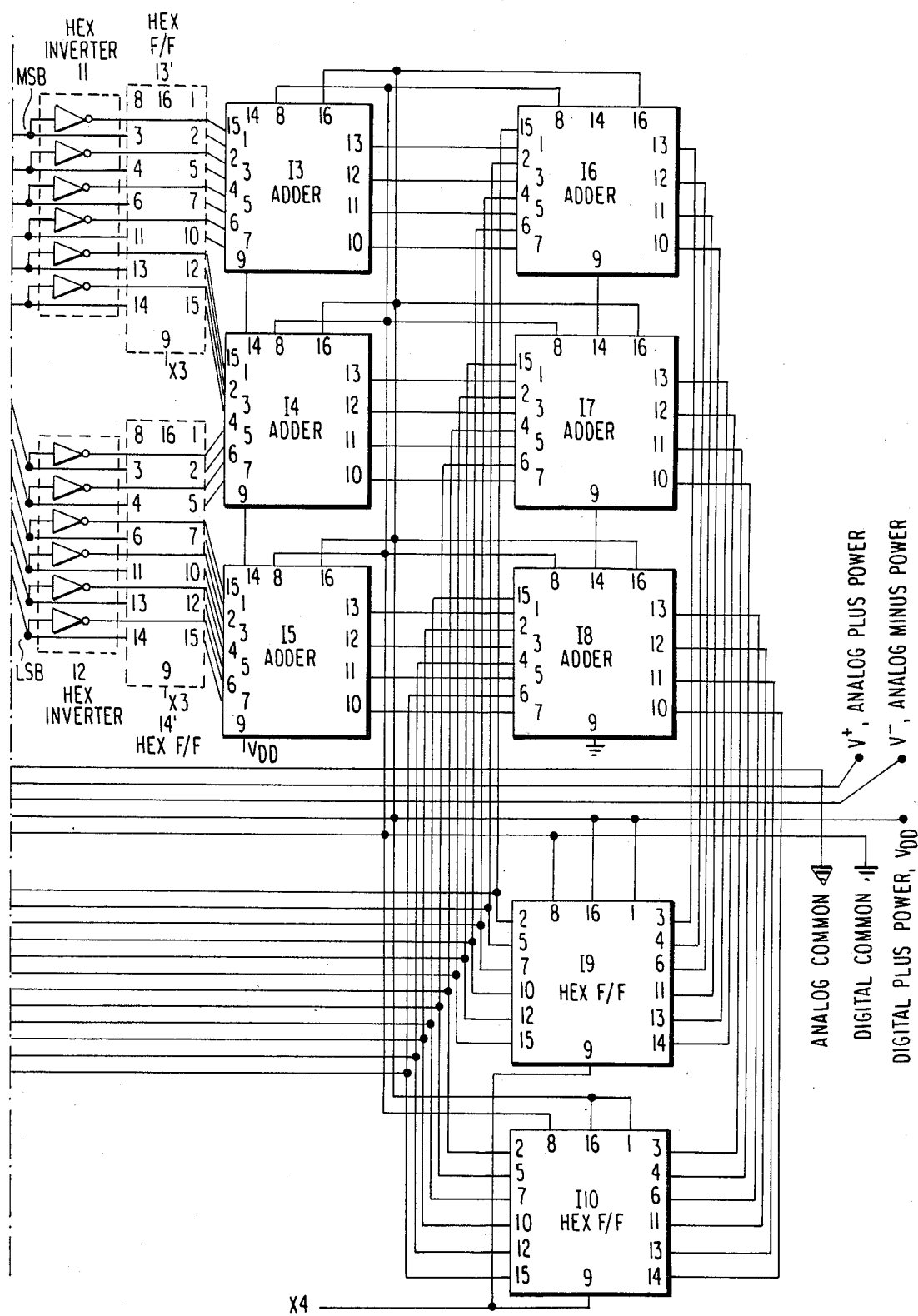
FIG. 9 is a schematic diagram of a further embodiment of the invention in which the feedback loop balances a current integral.

In FIG. 9, an analog input signal is presumed present at Test Point A (TPA), corresponding to the input $V_s$ in FIG. 1B. If the signal from the transducer is at too high an impedance level for operating the signal conditioner, an impedance changer is interposed so that the impedance level at TPA is satisfactory, as in the case of the earlier embodiments.

When the system is operating at steady state, i.e., with flow rate constant, during the window interval W the charge (integral of the current injected from TPA to the summing junction) is equal and opposite to the charge injected from Test Point B (TPB). This is similar to the operation of FIG. 1B, with the resistor R58 in FIG. 9 corresponding to the resistor $R_f$ in FIG. 1B. Under this steady state condition, the output of amplifier A11 is zero at the conclusion of W, due to the integration element INT described below. As discussed earlier, it is possible to function without the INT, in which case the output of amplifier A11 equilibrates to a constant, non-zero error voltage prooortional to the flow rate at the conclusion of W. It is preferable, however, to use the INT, so that a null-balance system is obtained. The circuitry of FIG. 9 includes the following six elements, each of which will be described separately below: Integrating sampler IS, Analog-to-Digital Converter ADC, phase-sensitive detector PSD, Integrator INT, Digital-to-Analog Converter DAC, and feedback elements.

With regard first to the integrating sampler IS, this is a conventional analog integrator and consists of the circuitrv around amplifier A11, including C51, SW4A and SW4B. The resistors for the integrator are R54 (the input resistor) and R58 (the feedback resistor). Note that the arrangement of this circuitry is substantially similar to that shown in FIG. 1F. In principle, the IS could function as a digital device, by a rapid sequence of samples which would each be converted to digital form and then summed. However, at today's state of the art, the analog form of the IS is preferable.

The analog-to-digital converter ADC is a 12-bit device similar to the model 572 manufactured by Analog Devices. Note, however, that ADC can operate with fewer bits. More particularly, at equilibrium the ADC converts a voltage that is nominally zero (the output of amplifier A11) and hence few bits are required. However, if the flow rate changes rapidly (during nonequilibrium), the ADC might overflow or saturate. This could result in the instrument being sluggish while waiting for the INT to eventually integrate to the proper value.

The phase Sensitive Detector PSD consists of the Hex inverters I1 and I2, the Hex flip-flops I3' and I4' used as latches, and the adders I3, I4 and I5. The Hex Inverters may be CMOS 4069 inverters available from RCA. The Hex flip-flops may be 40174 flip-flops available from RCA. The Adders may be 4008 adders also available from RCA.

The integrator INT consists of the adders I6, I7 and I8 as well as the Hex flip-flops I9 and I10 used as latches.

The PSD and INT are identical in function to the similar analog variety of the elements described above. Use of the analog variety requires exceeding care in analog offset voltages in the PSD and INT. Reliance on the digital variety substantially eliminates this concern.

The digital-to-analog converter DAC is shown as a 12-bit version similar to the model 7545 manufactured bv Analog Devices. Also shown are the elements ancillary to it, i.e., the networks surrounding amolifiers A13 and A14, all as described in the Analog Devices 1984 Databook. As described earlier herein, the reference voltage $V_{ref}$ is a voltage prooortional to the magnetic induction employed in the primary unit. The DAC multiplies $V_{ref}$ by the digital number at its input, which is provided at the output of the INT as shown in FIG. 9. The output of amplifier A13 associated with the DAC is an analog voltage proportional to the product of $V_{ref}$ and the digital number. The DAC operates in a four-quadrant mode, although this would be unecessary if there were no need to monitor negative flow rates.

Figure 10:
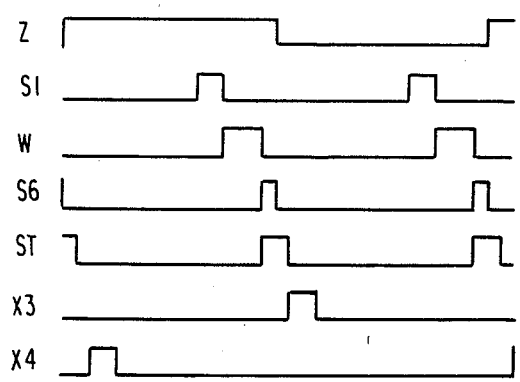
FIG. 10 is a timing diagram for explaining the operation of the circuitry of FIG. 9.

The timing signals of FIG. 10 could be generated by any suitable timing circuitry, and need not be described in further detail here.

The operation of the embodiment of FIG. 9 will now be described with reference also to the timing diagram of FIG. 10.

The logic strobe Z is in-phase with the magnetic alternation of the flow meter. The sampling window W is delayed as late as is feasible after each magnet transition. In the timing diagram of FIG. 10, the strobe W is shown to be delayed not quite as far as possible, but the time between the falling edge of W and the transition in Z is sometimes used by oreamplifiers or impedance changers to carry out a reset, as described in U.S. Pat. No. 4,458,542.

Prior to commencement of the sampling window W, the output of amplifier A11 is held at its reset value of zero, a typical precaution for analog integrators to make sure that a small offset voltage does not have time to integrate up to large magnitudes at the output of amplifier A11. Strobe S1 carries out the reset via the switch SW4B. The switch SW4 shown in FIG. 9 is similar to the dual CMOS SPDT model DG303 manufactured by Siliconix. A portion of the B part of the switch is superfluous and is shown simply idling with one of its terminals connected to common.

Integration commences when switch SW4A is closed by strobe W, when the normally-closed portion of SW4A disconnects from common, as shown in FIG. 9. At the conclusion of W, the integrating portion of SW4A opens, and the integrated value is thereafter held at the output of amplifier A11.

To ensure that no spurious voltages leak through the opened sampling switch, the normally closed portion of the switch reconnects to common. This normally-closed portion of the switch SW4A is not fundamentally necessary, but it is recommended as a precaution.

When the W strobe falls, the output of amplifier A11 holds at a constant value, representative of the change in flow generated voltage measured during Z-true, i.e., during the high level of the logic strobe Z. Recall that at equilibrium, the output of amplifier A11 after the sampling interval is nominally equal to zero. The logic strobe S6 then initiates the A/D conversion by the ADC. The strobe ST in FIG. 10 is generated by the ADC, and it takes a high level during the conversion process. As soon as conversion is completed, signified by the fall of ST, the digital number output from the ADC is latched into the Hex flip-flops I3' and I4'.

A process similar to that just described takes place during the next half-cycle of the flowmeter magnet alternation, i.e., during Z-false. This time, however, the 5 bits of the ADC output are inverted by Hex Inverter I1 and I2. At the conclusion of the ST strobe of this half-cycle, the output of adders I3, I4 and I5 is the phase sensitive rectified or demodulated output of the ADC. Note that the adder I5 has had unity added to it, via $V_{DD}$ at pin 9, so that the usual algorithm has been used to multiply the ADC output by −1 during the Z-false half-cycle of operation.

At the conclusion of each full cycle, strobe X4, using adders I6, I7 and I8, adds the above-described rectified value to that already stored on the output of Hex flip-floos I9 and I10. This summation constitutes the digital integration. The updated integrated value at the output of I9 and I10 causes the DAC to outout an updated analog feedback voltage (at the output of amplifier A13) in time for the next sampling interval W.

During steady flow, the digital number at the input to the ADC is an accurate measure of the flowrate. This digital number is updated onec each full flowmeter cycle.

The IS, ADC, PSD and INT are all in the forward gain portion of the overall loop. Hence, high accuracy in these elements is not as important as accuracy in the multiplying ADC.

In the digital embodiment described above with reference to FIG. 9, the various signal processing functions are performed by respective hardward elements. However, it should be clear that the same functions could be performed by a microprocessor with associated RAM and ROM.

It should also be noted that, while the preferred embodiment of the invention samples the sum signal once during every half cycle of the magnetic field, it would be possible to sample the sum signal only during the first half cycle, or even once every n full cycles, if the consequent decrease in accuracy were acceptable.

I claim:

1. A stable, accurate voltage-frequency converter for use with an electromagnetic flowmeter, which flowmeter includes means generating an electromagnetic field of magnetic induction B, comprising:
   (a) a summing junction coupled to a flowmeter generated analog voltage,
   (b) a first sampling switch and a forward processing chain coupled to said summing junction via said first sampling switch,
   (c) said forward chain including,
      (i) an integrator,
      (ii) a detector, and
      (iii) a VCO for producing a VCO output at a frequency directly proportional to said flowmeter generated analog voltage,
   (d) feedback means responsive to said VCO output and to a magnet signal related to said magnetic induction B to couple a product signal to said summing junction which is related to a product of said magnet signal and a frequency of said VCO output,
   (e) a counter, means phase locking said counter to a power mains frequency, means responsive to said counter for generating a series of different control signals for operating said first sampling switch.

2. The apparatus of claim 1 wherein said feedback means includes:
   an up/down counter driven by said VCO output, and means for enabling said up/down counter to count up for a predetermined time,
   a second sampling switch, means controlled by an output of said up/down counter for operating said second sampling switch to couple said magnet signal to said summing junction for a prescribed time.

3. The apparatus of claim 1 wherein said feedback means includes:
   an up/down counter driven by said VCO output, and means for enabling said up/down counter to count up for a predetermined time,
   a multiplying DAC supplied with an output of said up/down counter and said magnet signal, said multiplying DAC providing an output to said summing junction.

4. The apparatus of claim 1 wherein said feedback means includes:
   an up/down counter driven by said VCO output, and means for enabling said up/down counter to count up for a time related to a period of a power main's frequency,
   first means responsive to a count attained by said up/down counter and to said magnet signal for driving said summing junction.

5. The apparatus of claim 4 wherein said first means includes:
   a second sampling switch, means controlled by an output of said up/down counter for operating said second sampling switch to couple said magnet signal to said summing junction for a prescribed time.

6. The apparatus of claim 4 wherein said first means includes:
   a multiplying DAC supplied with an output of said up/down counter and said magnet signal with an output coupled to said summing junction.

7. The apparatus of claim 1 wherein said forward processing chain also includes:
   (a) a second integrator coupled between said detector and said VCO.

8. The apparatus of claim 1 which further includes:
   (a) a comparator coupled to said forward processing chain with an output indicating a polarity for said flowmeter generated analog voltage,
   (b) a polarity control circuit responsive to an output of said comparator and coupled to an input of said VCO to insure that any input to said VCO is of a positive polarity.

9. The apparatus of claim 8 which further includes a frequency divider responsive to said VCO output, a first output port of said voltage-frequency converter coupled to an output of said frequency divider and a second output port of said voltage-frequency converter coupled to said comparator output.

10. The apparatus of claim 8, in which said feedback means further includes:
   (b) a second polarity control circuit responsive to said reference voltage source and said output of said comparator for controlling the oolarity of said reference voltage in accordance with said comparator output to ensure a voltage coupled to said summing junction by said feedback means has a polarity to oppose said flowmeter generated analog voltage, (c) means for generating a second switch control signal in accordance with the frequency of said VCO output, (d) a second samoling switch connected between said second polarity control circuit and said summing junction and controlled by said second switch control signal for coupling said product signal to said summing junction.

11. The apoaratus of claim 1, wherein said detector comprises a phase sensitive detector.

12. The apparatus of claim 1, which further includes:
(a) a reference voltage source,
(b) a comparator coupled to said forward processing chain with an output indicating a polarity for said flowmeter generated analog voltage,
(c) a polarity control circuit responsive to said reference voltage source and said output of said comparator for controlling the polarity of said reference voltage in accordance with said comparator output to ensure a voltage coupled to said summing junction by said feedback means has a polarity to oppose said flowmeter generated analog voltage,
(d) means for generating a second switch control signal in accordance with the frequency of said VCO output, and
(e) a second sampling switch connected between said polarity control circuit and said summing junction and controlled by said switch control signal for coupling said product signal to said summing junction.

13. A signal conditioner for receiving an input analog voltage and processing said input analog voltage to obtain an out put signal, for use with an electromagnetic flowmeter, which flowmeter includes means for generating an electromagnetic field of magnetic induction B, said electromagnetic field having successive full cycles each comprising first and second half cycles, said signal conditioner comorising:

summing means for summing said input analog voltage with an analog feedback signal to obtain a sum signal;

forward channel signal generating means resoonsive to said sum signal for generating a further signal directly proportional to said inout analog voltage: and feedback means, responsive to said further signal and to a magnet signal related to said magnetic induction B, for providing only a single pulse of said analog feedback signal to said summing junction during each half cycle of said electromagnetic field.

14. A signal conditioner as defined in claim 13, wherein said forward channel signal generating means includes a sampling integrator for integrating said sum signal during a sampling interval in each half cycle and providing an integrator output, and a phase-sensitive detection means for detecting said integrator output in synchronism with said electromagnetic field.

15. A signal conditioner as defined in claim 14, wherein said integrator output is an analog voltage, said forward channel signal generating means further comprising Analog-to-Digital (A/D) conversion means for converting said integrator output to a digital signal, said phase-sensitive detection means including inversion means for selectively inverting successive outputs from said A/D conversion means during periods of time corresoonding to alternate half-cycles of said electromagnetic field, and digital adders for adding the outputs of said inversion means during each full cycle of said electromagnetic field.

16. A signal conditioner as defined in claim 15, wherein said forward channel signal generating means further comorises a digital accumulator for accumulating outputs from said digital adders and providin said further signal once during each full cycle of said electromagnetic field.

17. A signal conditioner as defined in claim 13, wherein said forward channel signal generating means includes sampling means for sampling said sum signal during a window W during each half cycle of said electromagnetic field, and said single pulse of said analog feedback signal is provided during said window W.

18. A signal conditioner for receiving an input analog voltage and processing said input analog voltage to obtain an output signal, for use with an electromagnetic flowmeter, which flowmeter includes means for generating an electromagnetic field of magnetic induction B, said signal conditioner comprising:

summing means for summing said input analog voltage with an analog feedback signal to obtain a sum signal;

sampling means for sampling said sum signal during successive sampling intervals to provide successive sampled signals;

forward channel signal generating means responsive to said sampled signals for generating a further signal directly proportional to sdid input analog voltage; and feedback means, responsive to said further signal and to a magnet signal related to said magnetic induction B, for providing only a single pulse of said analog feedback signal to said summing means during each of aaid sampling intervals.

19. A signal conditioner as defined in claim 18, wherein said electromagnetic field is an alternating electromagnetic field having successive full cycles each made up of first and second half cycles, and wherein said sampling means samples said sum signal no more than once during each half cycle.

20. A signal conditioner as defined in claim 18, wherein said single pulse of said analog feedback signal is provided for the entire duration of each said sampling interval.

21. A signal conditioner as defined in claim 18, wherein the duration of each single pulse of said analog feedback signal is less than the duration of each said sampling interval.

22. A signal conditioner as defined in claim 19, wherein said sampling means samples said sum signal every n half cycles, where n is an integer greater than 1.

* * * * *